(12) United States Patent
Sasada et al.

(10) Patent No.: US 7,093,861 B2
(45) Date of Patent: Aug. 22, 2006

(54) EXHAUST PIPE JOINT STRUCTURE AND COIL SPRING USED IN THE SAME

(75) Inventors: Hironobu Sasada, Kyoto (JP); Takashi Yanagihara, Kyoto (JP); Suekichi Hangeishi, Toyota (JP)

(73) Assignees: Suncall Corporation, Kyoto (JP); Toyota Jidosha Kabushiki Kaisha, Aichi (JP)

( * ) Notice: Subject to any disclaimer, the term of this patent is extended or adjusted under 35 U.S.C. 154(b) by 260 days.

(21) Appl. No.: 10/478,098

(22) PCT Filed: Feb. 21, 2002

(86) PCT No.: PCT/JP02/01533

§ 371 (c)(1),
(2), (4) Date: Nov. 19, 2003

(87) PCT Pub. No.: WO03/071108

PCT Pub. Date: Aug. 28, 2003

(65) Prior Publication Data

US 2004/0135366 A1 Jul. 15, 2004

(51) Int. Cl.
*F16L 27/04* (2006.01)
(52) U.S. Cl. .............. 285/261; 285/267; 285/268; 285/49
(58) Field of Classification Search .............. 285/49, 285/51, 146.1, 261, 266, 267, 268
See application file for complete search history.

(56) References Cited

U.S. PATENT DOCUMENTS

| | | | | | |
|---|---|---|---|---|---|
| 1,780,693 | A | * | 11/1930 | Yazel | 285/9.2 |
| 3,188,115 | A | * | 6/1965 | Morrish et al. | 285/18 |
| 4,871,181 | A | * | 10/1989 | Usher et al. | 277/627 |
| 4,928,998 | A | * | 5/1990 | Brandener | 285/49 |
| 5,040,805 | A | * | 8/1991 | Ozora | 277/627 |
| 5,203,593 | A | * | 4/1993 | Brandener | 285/49 |
| 5,683,119 | A | * | 11/1997 | Emmons et al. | 285/146.3 |
| 5,779,282 | A | * | 7/1998 | Ezze | 285/261 |
| 6,164,067 | A | * | 12/2000 | Cronje | 60/322 |
| 6,279,965 | B1 | * | 8/2001 | Kida | 285/268 |
| 6,312,022 | B1 | * | 11/2001 | Brophy et al. | 285/268 |

FOREIGN PATENT DOCUMENTS

| | | | |
|---|---|---|---|
| EP | 0 499 119 A1 | | 8/1992 |
| JP | 1-299393 | * | 12/1989 |
| JP | 3-253716 | * | 11/1991 |
| JP | 5-231575 | * | 9/1993 |
| JP | 6-1721 | | 1/1994 |
| JP | 7-30319 | | 6/1995 |

(Continued)

*Primary Examiner*—James M. Hewitt
(74) *Attorney, Agent, or Firm*—Osha Liang L.L.P.

(57) ABSTRACT

An automobile exhaust-pipe joint structure and a coil spring for use therein. The exhaust pipe connection structure includes a first exhaust pipe having a first flange section, a second exhaust pipe having a second flange section, a ball joint section for connecting the first and second exhaust pipes flexibly, and coupling mechanisms provided at a plurality of positions of the first and second flange sections. One exemplary coupling mechanism includes a bolt member penetrating the first flange section and being secured, at one end part thereof, to the second flange section, and a coil spring of deformed cross-section interposed between the other end part of the bolt member and the first flange section, wherein the cross-section of a wire is reduced in diameter, in the compressing direction with a dimensional ratio between the short diameter and long diameter thereof being in the range of 1.1–2.6.

14 Claims, 6 Drawing Sheets

FOREIGN PATENT DOCUMENTS

| | | |
|---|---|---|
| JP | 10-53842 | 2/1998 |
| JP | 2001-304336 | 10/2001 |

\* cited by examiner

EXHAUST PIPE JOINT STRUCTURE AND COIL SPRING USED IN THE SAME

TECHNICAL FIELD

The present invention relates to a joint structure using a ball joint for an automobile exhaust pipe and to a coil spring used in the same.

BACKGROUND ART

Ball joints have been used as vibration isolation joints in an automobile exhaust line. They absorb the vibration of a car body to prevent an excessive stress from acting on an engine exhaust section and an exhaust-pipe joint section.

Various specific joint structures have been proposed and put in actual use. For example, there are joint structures described in JP-A-10-176777 and JP-UM-T-2598461.

Figure 6:
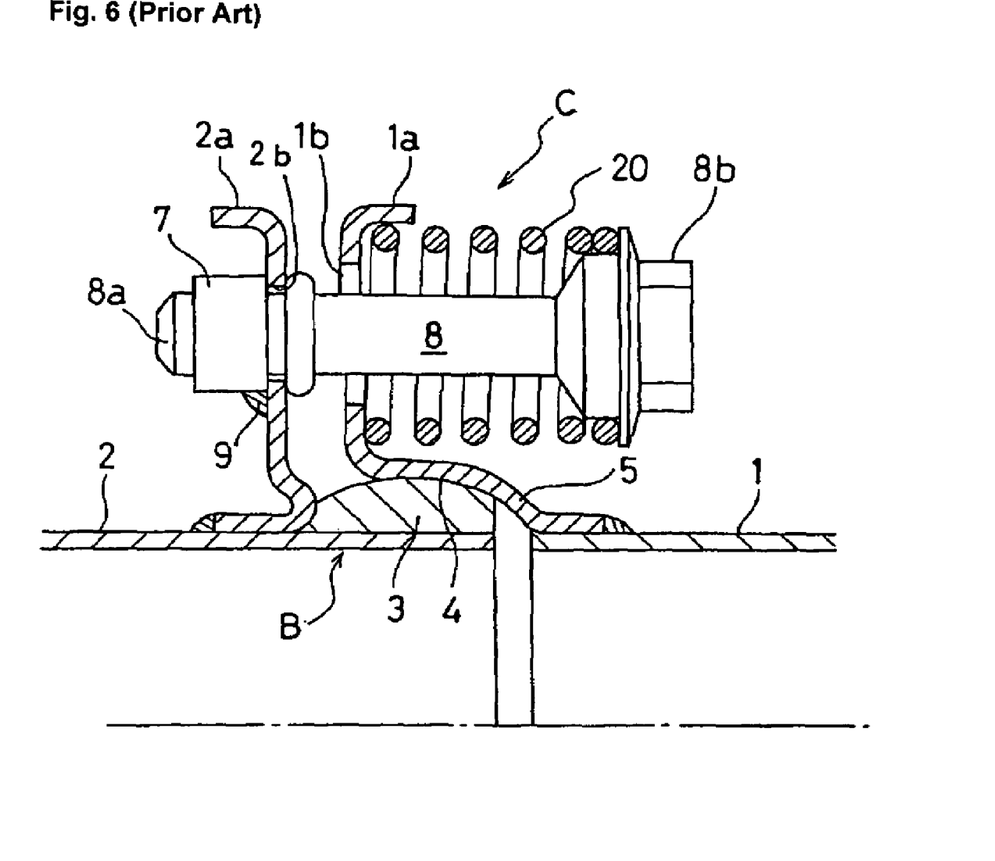
FIG. 6 is a sectional view of an essential part of one example of a conventional exhaust-pipe joint structure.

A typical structure will be described with reference to FIG. 6.

An exhaust pipe is composed of a first exhaust pipe 1 and a second exhaust pipe 2. The exhaust pipes 1 and 2 are flexibly joined together with a ball joint mechanism B.

The first exhaust pipe 1 guides exhaust gas from an automobile engine to the second exhaust pipe. The first exhaust pipe 1 is called an exhaust manifold. The second exhaust pipe 2 discharges the exhaust gas into the atmosphere.

More specifically, the joint section between the first exhaust pipe 1 and the second exhaust pipe 2 has a ball section 3 shaped like a ball in external form adjacent to the second exhaust pipe 2, and has a flare section 5 near the first exhaust pipe 1. The flare section 5 has an inner curve 4 corresponding to the ball section 3.

The first exhaust pipe 1 and the second exhaust pipe 2 have a first flange section 1a and a second flange section 2a, respectively. The first flange section 1a and the second flange section 2a have opposed surfaces, respectively. The flange sections 1a and 2a have openings 1b and 2b at opposed positions so that a bolt 8 (described later) is passed through. The flange sections 1a and 2a are fixed to each other with joint mechanisms C.

The joint mechanisms C are provided at a plurality of positions of the first and second flange sections to join the first and second flange sections together.

One of the joint mechanisms C has a nut 7, the bolt 8, and a coil spring 20. The nut 7 is fixed to the periphery of the opening 2b of the second flange section 2a by welding 9.

The bolt 8 passes through the respective openings 1b and 2b of the flange sections 1a and 2a. One end 8a of the bolt 8 is screwed and secured in the nut 7. The bolt 8 is passed through the center of the winding coil spring 20.

The coil spring 20 is arranged between the other end (i.e., head) 8b of the bolt 8 and the first flange section 1a. The coil spring 20 pushes the first exhaust pipe 1 through the first flange section 1a toward the second exhaust pipe 2.

When a bending force is applied between the first exhaust pipe 1 and the second exhaust pipe 2 by the vibration of the car body, the ball section 3 slides in the inner curve 4 of the flare section 5 to allow the first exhaust pipe 1 and the second exhaust pipe 2 to curve. The coil spring 20 keeps the close contact between the ball section 3 and the inner curve 4 to prevent leakage of exhaust gas.

In such an exhaust-pipe joint structure, the coil spring 20 is formed by winding a circular-section wire rod in coiled form. The height of the coil spring 20 is given by n×d when compressed until the wire rods constituting the coil spring 20 come into contact with each other, where d is the diameter of the wire rod and n is the number of turns of the coil spring.

Accordingly, the length of part of the bolt 8 which is passed through the coil spring inevitably must be longer than n×d. This increases the full length of the bolt 8, thus increasing the weight relatively.

Also, because the coil spring is high, the lateral movement increases when a bending stress is applied in use. Also, there is the problem of increasing the contact between the wire rods of the coil spring to increase the moment.

On the other hand, it is the most important object to improve the fuel efficiency of cars in view of recent environmental issues. To this end, automobile makers have been making various improvements including development of high-efficiency engines, improvement in a combustion method, improvement in fuel quality, development of new driving sources such as fuel cells. On the other hand, it is well known that continuous efforts have been made to improve fuel efficiency by weight reduction of car bodies.

In order to reduce the weight of car bodies, strenuous efforts have been made from the weight reduction of car body structures to the weight reduction of various components in grams.

Also the exhaust pipe system that is the subject of the present invention intends to make the exhaust pipe thinner and to make the bolt 8 of the joint mechanism C smaller in diameter. Although it is said that the weight reduction is recently at its limit, further weight reduction is required for the Earth's environment.

The present invention has been made in consideration of the present situation. Accordingly, it is a first object of the invention to provide a coil spring capable of further weight reduction of an exhaust-pipe joint structure and a new exhaust-pipe joint structure using the coil spring. Furthermore, a second object is to provide a coil spring capable of cost reduction of an exhaust-pipe joint structure and a new exhaust-pipe joint structure using the coil spring.

DISCLOSURE OF THE INVENTION

The present invention has been made, focusing on improvements in the structure of a coil spring, to which no attention has been paid in the conventional weight reduction measures.

In order to achieve the above objects, the coil spring according to the invention is formed of the following wire rod that is wound in coiled shape. The cross section of the wire rod of the coil spring is a deformed cross section having a minor axis and a major axis such that it is small in diameter in the direction in which the coil spring is compressed. The dimension ratio of the major axis to the minor axis is within the range from 1.1 to 2.6.

The automobile exhaust-pipe joint structure according to the invention is an exhaust-pipe joint structure that uses the coil spring of the invention in order to achieve the above objects.

The automobile exhaust-pipe joint structure includes a first exhaust pipe having a first flange section at one end; a second exhaust pipe having a second flange section at one end; a ball joint mechanism disposed at the ends at which the first flange section of the first exhaust pipe and the second flange section of the second exhaust pipe are formed to flexibly join the first exhaust pipe and the second exhaust pipe together; and joint mechanisms disposed in a plurality of positions of the first flange section and the second flange section, for joining the first flange section and the second flange section together.

One of the joint mechanisms includes a bolt one end of which is fixed to the second flange section through the first flange section; and a coil spring arranged between the other end of the bolt and the first flange section, the joint mechanism using as the coil spring the above-described coil spring of the present invention.

BEST MODE FOR CARRYING OUT THE INVENTION

Figure 1:
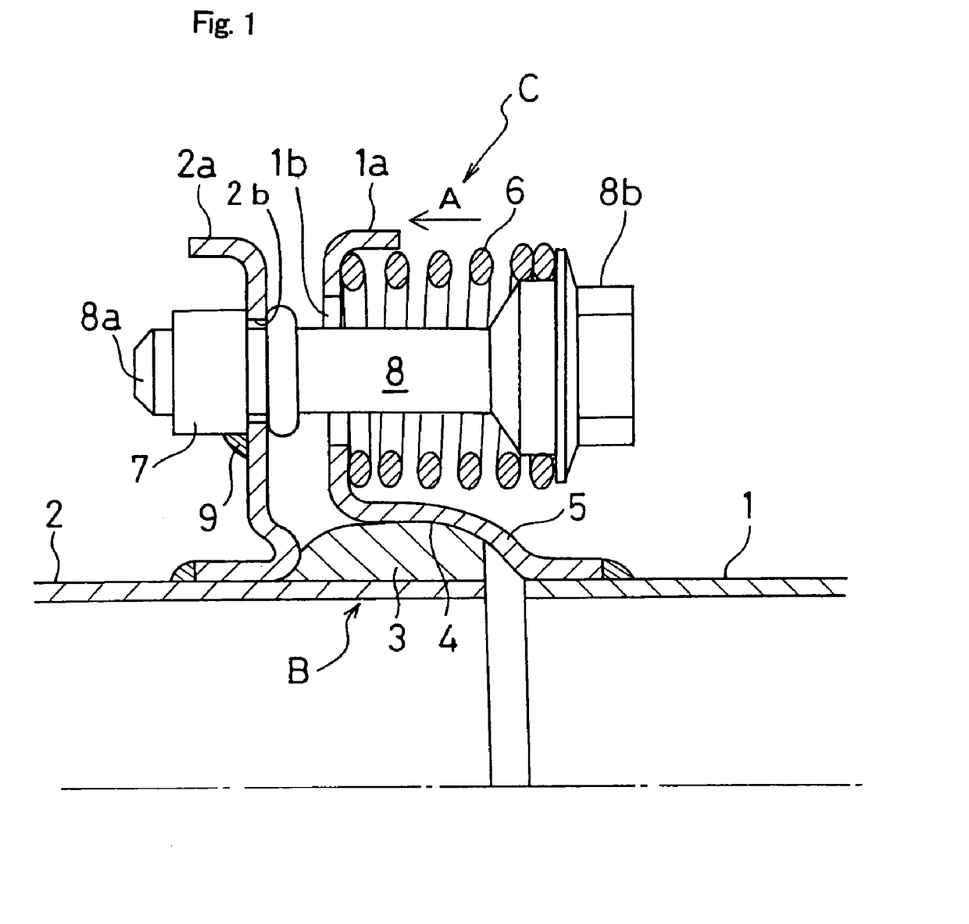
FIG. 1 is a sectional view of an essential part of an exhaust-pipe joint structure according to an embodiment of the present invention.

Referring to FIGS. 1 to 5(b), an embodiment of the present invention will be described hereinafter. Components that function as in those of FIG. 6 are given by the same reference numerals and a description thereof will be omitted. Referring to FIG. 1, a part different from FIG. 6 is a coil spring. In FIG. 1, numeral 6 denotes a coil spring.

The automotive exhaust-pipe joint structure of the present invention is an exhaust-pipe joint structure that uses a coil spring according to the invention.

In the embodiments, the coil spring 6 of the invention is formed by winding a wire rod in coil form, as shown in FIG. 1. The wire rod is deformed in cross section such that it is small in diameter in the direction A in which the coil spring 6 is compressed and long in diameter in the direction crossing the direction A in which the coil spring 6 is compressed.

Figure 2:
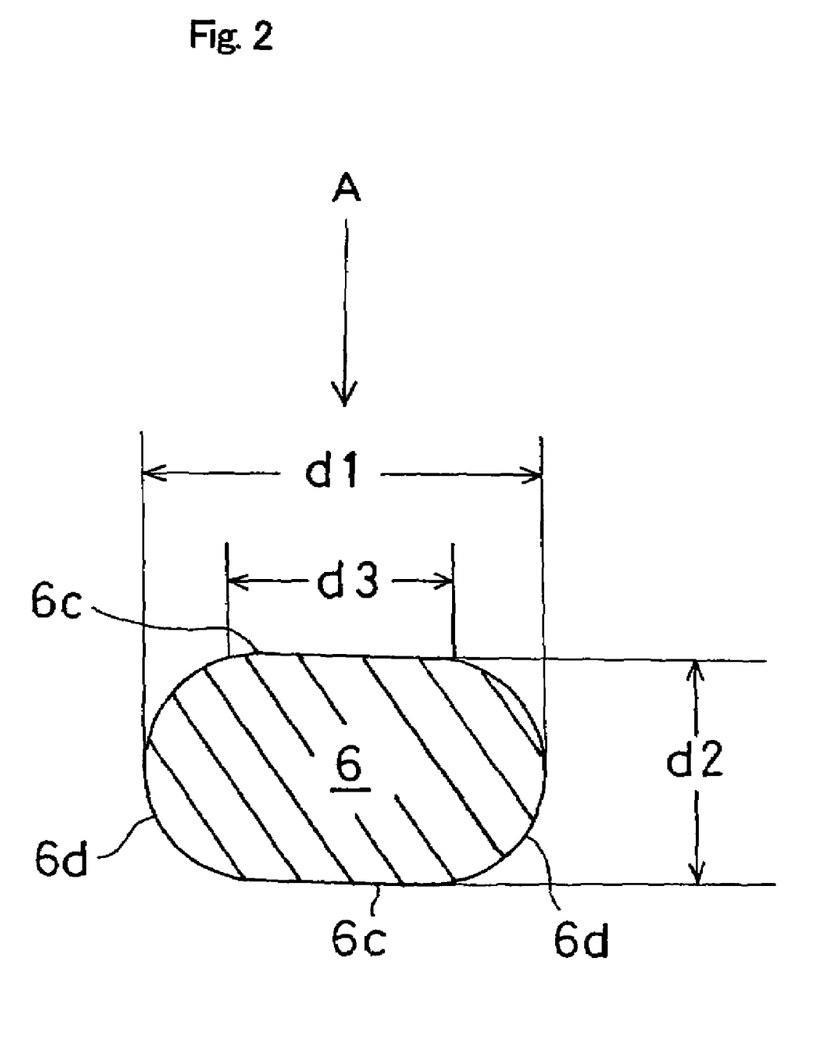
FIG. 2 is a sectional view of a coil of a coil spring of FIG. 1.

More specifically, referring to FIG. 2, the deformed cross section of the wire rod is a flat cross section having two straight lines 6c extending along the major axis in parallel. The straight lines 6c are formed to cross the direction A in which the coil spring 6 is compressed. The straight lines 6c in the cross section extend along the major axis of the wire rod to form a planar surface 6e of the wire rod (refer to FIG. 3).

Furthermore, the deformed cross section of the wire rod has two circular arcs 6d. The two circular arcs 6d are located between the straight lines 6c to connect the respective ends of the straight lines 6c together. Both of the circular arcs 6d are curved to project from the straight lines 6c.

The ratio of a major axis d1 to a minor axis d2 (d1/d2) is preferably set within the range from 1.1 to 2.6. When the ratio is smaller than 1.1, there is no difference in effect from the conventional circular-section wire rod. When the ratio exceeds 2.6, the cross section of the wire rod comes into a nearly plate shape to decrease the spring constant. Therefore, the number of turns of the coil spring must be increased, thus posing the problem of increasing the height of the coil spring. It is most preferable to set the ratio of the major axis d1 to the minor axis d2 (d1/d2) within the range from 1.3 to 2.0.

The method of making the wire rod of the coil spring 6 includes the following: a method of passing the conventionally-used circular-section wire rod between a pair of upper and lower reduction rollers to cold roll it or a method of cold drawing the circular-section wire rod.

The cold rolling or the cold drawing increases the hardness of the wire rod. Therefore, the strength, fatigue characteristics, and the characteristic against permanent set are increased. This provides low-cost high-quality wire rods.

Also, this provides wire rods finer than the conventional ones, so that it is to be expected that the coil spring will be decreased in weight.

The dimension ratio (d3/d1) of the length d3 of the straight lines 6c of the cross section (the width of the planar surface 6e) to the major axis d1 is preferably set within the range from 0.4 to 0.9. When the value is smaller than 0.4, sufficient effects flatness and of cold working cannot be provided. When the value is larger than 0.9, the flatness becomes excessive so that the coil spring 6 becomes a nearly plate shape, which may produce the problem of an improper spring constant. The ratio of the length of the straight lines 6c (i.e., the width of the planar surface) to the major axis d1 is more preferably within the range from 0.5 to 0.8.

When the cross section of the wire rod is flat shaped, the height of the coil spring in a state in which it is compressed to come into contact with each other (i.e., closed height) is smaller than that of the conventional coil springs with the circular-section wire rod.

Particularly, setting the ratio of the major axis to the minor axis in the above-described predetermined range allows the closed height to be decreased as much as a maximum of 60 percent.

Consequently, even with a coil spring having the same spring constant as that of the conventional ones, the height of the uncompressed coil spring (i.e., free height) can be decreased. Therefore, the length of the bolt 8 used in combination with the coil spring can also be decreased. This can significantly decrease the weight of the coil spring 6 and the bolt 8 that form the joint mechanism C.

Particularly, the optimal design allows the total weight of the bolt and the coil spring to be reduced to about 50 percent of the conventional ones. It is to be expected that it will contribute to an improvement in fuel efficiency owing to the weight reduction of cars and to improvements in the problems of the Earth's environment including the problem of carbon dioxide.

When the displacement angles of the ball-joint section are the same, the free height decreases, so that the lateral movement of the coil spring is decreased. Accordingly, the contact of the wire rods of the coil is also decreased; thus, also the moment becomes smaller than that of the conventional ones at the same displacement angle. As a result, the vibration isolation performance of the ball joint section will be improved.

A significant decrease in the closed height of the coil spring increases the flexibility in selecting the dimensions of the material. This allows a compact and smart design of the coil spring and improves the in-vehicle mounting performance of the exhaust-pipe joint structure.

Figure 3:
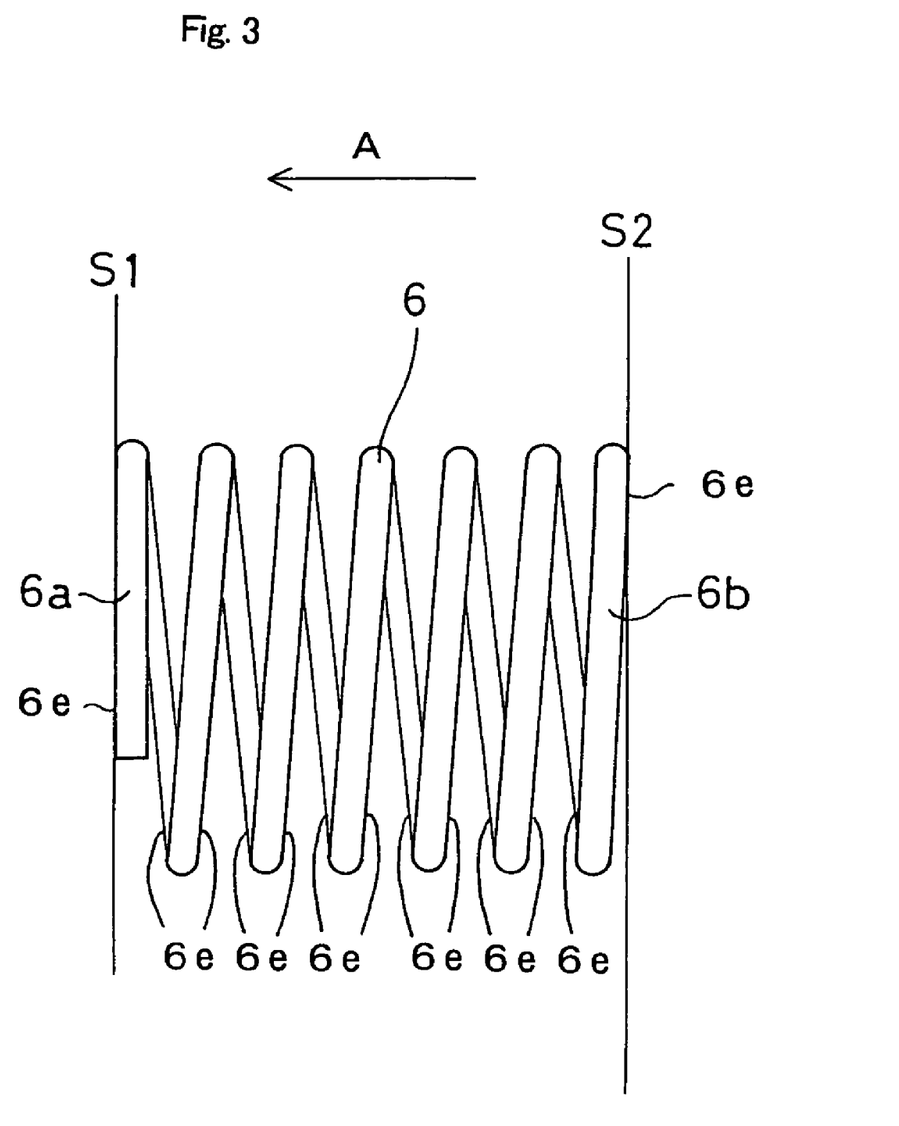
FIG. 3 is a side view of a coil spring formed by winding the flat-section wire rod of FIG. 2 in coiled form.
Figure 4:
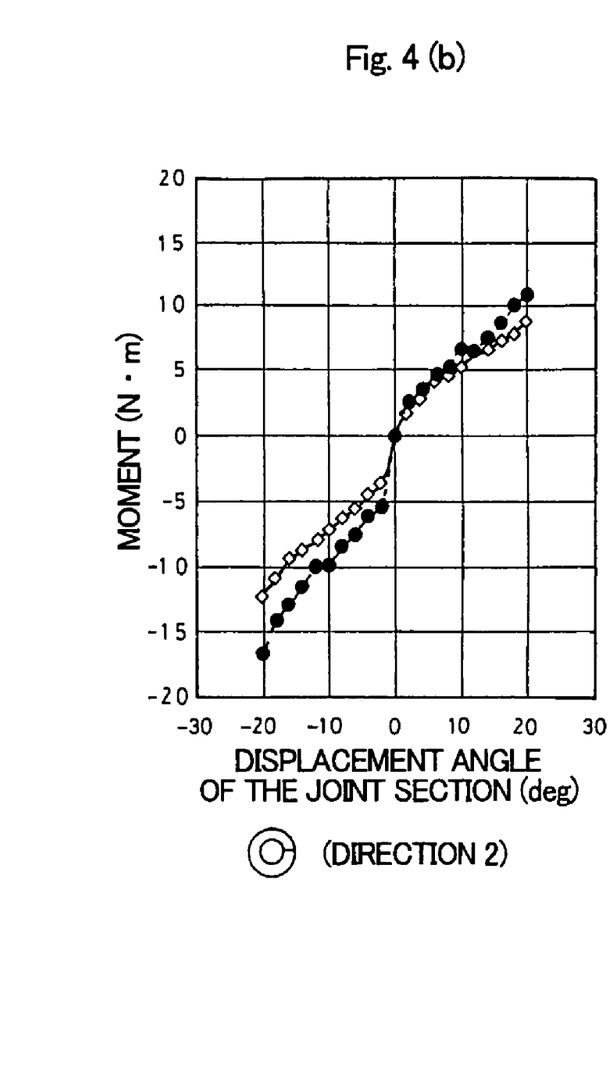
FIGS. 4(a), 4(b), 5(a), and 5(b) are graphs that compares the characteristics of the coil of the invention with those of a conventional coil spring.
Figure 5:
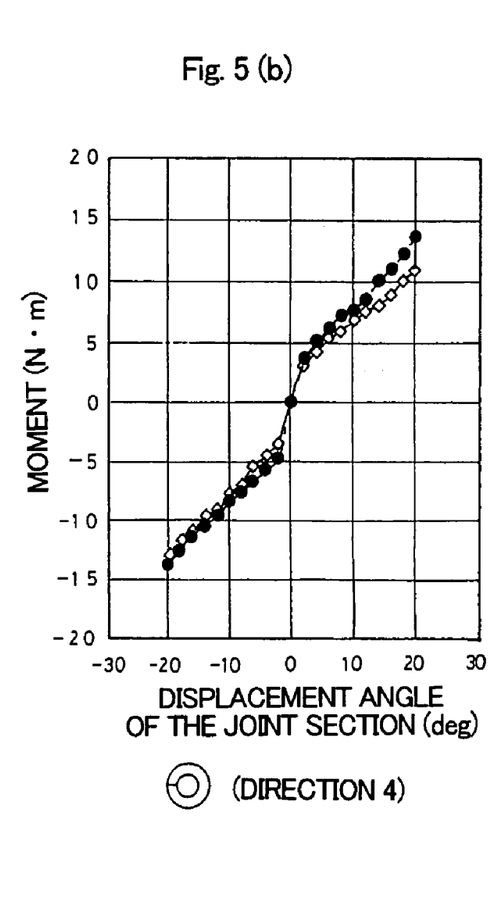

Referring to FIG. 3, at opposite ends 6a and 6b of the coil spring 6, flat bearing surfaces are formed to mount the coil. The bearing surfaces of the coil spring are formed by using the planar surfaces 6e of the wire rod of the coil spring.

More specifically, a starting end 6a of the coil spring 6 is wound to form the bearing surface for the coil such that at least 50 percent to 100 percent, preferably 80 percent to 100 percent, of the length of one turn at the starting end is in an assumed surface S1. Similarly, a terminal 6b of the coil spring 6 is wound to form the bearing surface for the coil such that at least 50 percent to 100 percent, preferably 80 percent to 100 percent, of the length of one turn at the terminal is in an assumed surface S2.

The member to which the coil spring is mounted has a planar mounting surface for the coil spring. The assumed surfaces S1 and S2 planes are assumed as the mounting surfaces.

At the opposite ends 6a and 6b of the coil spring 6, it is the planar surfaces 6e of the coil-spring wire rod that are substantially in the assumed surfaces S1 and S2.

Accordingly, it becomes unnecessary to grind the bearing surface of the coil spring, which was necessary for the conventional circular-section wire rods, resulting in simplification of the coil spring production process and the reduction of production cost.

When the conventional circular-section wire rod is used, the opposite ends of the coil spring were ground into a planar surface to form a planar bearing surface for the coil spring. Therefore, according to the invention, no chips generate, thus contributing to the reduction of wastes in production process.

[Test]

The moment that acts on the bolt was measured. The coil springs used in the measurement were made as follows:

EXAMPLE

A circular-section SUS316N wire rod (3.2 mm in diameter) was prepared. The wire rod was cold rolled to form a flat-section wire rod. The flat section measured as follows:

Major axis (d1)=3.52 mm; minor axis (d2)=2.55 mm; the ratio of major axis to minor axis (d1/d2)=1.38; width of planar surface (d3)=1.8 mm; and the ratio of width of planar surface to major axis (d3/d1)=0.51.

A coil spring was made of the flat-section wire rod. The specifications of the coil spring were as follows:

Outside diameter=24 mm; total number of turns=4.5 (the number of active turns=3, the number of turns at opposite bearing surfaces=0.75); free height=30.5 mm; closed height=14.5 mm; and spring constant=29.4 N/mm (3 kgf/mm).

COMPARATIVE EXAMPLE

A coil spring was made of a circular-section SUS316N wire rod (3.2 mm in diameter) as a comparative example. The specifications of the coil spring were as follows:

The same spring constant as the coil spring of the above example [spring constant=29.4 N/mm (3 kgf/mm)]; total number of turns=7.5 (the number of active turns=5.5; the number of turns at opposite surfaces=1.0); and free height=42.0 mm.

The measurement was conducted as follows:

As FIG. 1 shows, the automotive exhaust-pipe joint structure was connected with the above coil spring. The coil spring and the bolt were used in the periphery of the exhaust pipe, two positions at 0° and 180°.

The moment that acts on the bolt was measured while a bending stress was applied to the ball joint section. The direction in which the bending stress is applied included the following four-directions:

Direction 1:

The coil-spring-winding start position was set in the 12 o'clock position, seen from the position of applying a displacement stress.

Direction 2:

The coil-spring-winding start position was set in the 3 o'clock position, seen from the position of applying a displacement stress.

Direction 3:

The coil-spring-winding start position was set in the 6 o'clock position, seen from the position of applying a displacement stress.

Direction 4:

The coil-spring winding start position was set in the 9 o'clock position, seen from the position of applying a displacement stress.

The measurements are shown in the graphs of FIGS. 4(a), 4(b), 5(a), and 5(b). The graphs plot the relationship between the displacement angle (deg) of the ball joint section and the moment applied to the bolt (Nm). A rhomb-shaped mark in the graphs indicates the example and a filled-dot mark denotes the comparative example.

Referring to FIG. 4(a), the direction in which the bending stress acts is direction 1. Referring to FIG. 4(b), the direction in which the bending stress acts is direction 2. Referring to FIG. 5(a), the direction in which the bending stress acts is direction 3. Referring to FIG. 5(b), the direction in which the bending stress acts is direction 4.

(Consideration)

As the graphs clearly show, the example shows a lower moment than that of the comparative example in any directions in the same displacement angle. This shows that the vibration isolation performance of the joint section has been improved.

The result was probably obtained as follows:

The coil spring of the example can be lower in closed height than that of the comparative example. Therefore, in this example, also the free height of the coil spring could be set low, so that the bolt could also be shorter.

As a result, the lateral movement of the coil spring was decreased at the same displacement angle and the moment relative to displacement angle (i.e., oscillating torque) was also decreased.

While the preferred embodiment of the present invention has been described, it is to be understood that the invention is not limited to that and various modifications may be made without departing from the sprit and scope of the invention.

INDUSTRIAL APPLICABILITY

The coil spring according to the invention is most suitable as a coil spring capable of weight reduction and cost reduction of an automobile exhaust-pipe joint structure.

Furthermore, the automobile exhaust-pipe joint structure of the invention is most suitable as a joint structure capable of further weight reduction and cost reduction by using the coil spring according to the invention.

The invention claimed is:

1. an automobile exhaust-pipe joint structure, comprising:
   a first exhaust pipe having a first flange section at one end;
   a second exhaust pipe having a second flange section at one end;
   a ball joint mechanism disposed at the ends where the first flange section of the first exhaust pipe and the second flange section of the second exhaust pipe are formed to flexibly join the first exhaust pipe and the second exhaust pipe together; and joint mechanisms disposed in a plurality of positions at the first flange section and the second flange section, for joining the first flange section and the section flange section together;

wherein one of the joint mechanisms includes:
a bolt, one end of which is fixed to the second flange section through the first flange section; and
a coil spring disposed between the other end of the bolt and the first flange section;
wherein the cross section of the wire rod of the coil spring is a deformed cross section having a minor axis and a major axis such that it is small in diameter in the direction in which the coil spring is compressed, the dimension ratio of the major axis to the minor axis being within the range from 1.1 to 2.6.

2. An automobile exhaust-pipe joint structure according to claim 1, wherein the dimension ratio of the major axis to the minor axis is within the range from 1.3 to 2.0.

3. An automobile exhaust-pipe joint structure according to claim 1, wherein the cross section of the wire rod of the coil spring includes two straight lines extending along the major axis in parallel and two circular arcs located between both the straight lines to connect the respective ends of the straight lines together, both the circular arcs being curved to project from the straight lines; wherein the dimension ratio of the length of the straight lines to the major axis is within the range from 0.4 to 0.9.

4. An automobile exhaust-pipe joint structure according to claim 3, wherein the dimension ratio of the length of the straight lines to the major axis is within the range from 0.5 to 0.8.

5. An automobile exhaust-pipe joint structure according to claim 1, wherein the wire rod of the coil spring is a circular-section wire rod subjected to cold rolling or cold drawing so that the cross section has a major axis and a minor axis.

6. An automobile exhaust-pipe joint structure according to claim 1, wherein
the cross section of the wire rod of the coil spring has two straight lines extending in parallel in the direction to cross the direction of compression of the coil spring;
the wire rod of the coil spring has planar surfaces formed by the straight lines in the cross section extending along the length of the wire rod;
a starting end of the coil spring formed of the wire rod having the planar surfaces is wound to form a bearing surface for the coil such that at least from 50 percent to 100 percent of the length of one turn at the starting end is in an assumed surface; and
a terminal of the coil spring is similarly wound to form a bearing surface for the coil such that at least from 50 percent to 100 percent of the length of one turn at the terminal is in another assumed surface.

7. An automobile exhaust-pipe joint structure according to claim 6, wherein
the starting end of the coil spring formed by the wire rod having the planar surfaces is wound to form a bearing surface for the coil such that at least from 80 percent to 100 percent of the length of one turn at the starting end is in an assumed surface; and
the terminal of the coil spring is similarly wound to form a bearing surface for the coil such that at least from 80 percent to 100 percent of the length of one turn at the terminal is in another assumed surface.

8. A coil spring used as a coil spring in an automobile exhaust-pipe joint structure, wherein the automobile exhaust-pipe joint structure comprises a first exhaust pipe having a first flange section at one end; a second exhaust pipe having a second flange section at one end; a ball joint mechanism disposed at the ends where the first flange section of the first exhaust pipe and the second flange section of the second exhaust pipe are formed to flexibly join the first exhaust pipe and the second exhaust pipe together; and joint mechanisms disposed in a plurality of positions at the first flange section and the second flange section, for joining the first flange section and the second flange section together;

wherein one of the joint mechanisms includes: a bolt, one end of which is fixed to the second flange section through the first flange section; and a coil spring arranged between the other end of the bolt and the first flange section;
wherein the coil spring is formed by winding a wire rod in coiled form; and the cross section of the wire rod of the coil spring is a deformed cross section having a minor axis and a major axis such that it is small in diameter in the direction in which the coil spring is compressed, the dimension ratio of the major axis to the minor axis being within the range from 1.1 to 2.6.

9. A coil spring according to claim 8, wherein the dimension ratio of the major axis to the minor axis is within the range from 1.3 to 2.0.

10. A coil spring according to claim 8, wherein
the cross section of the wire rod of the coil spring includes two straight lines extending along the major axis in parallel; and two circular arcs located between both the straight lines to connect the respective ends of the straight lines together, the circular arcs being curved to project from the straight lines;
wherein the dimension ratio of the length of the straight lines to the major axis is within the range from 0.4 to 0.9.

11. A coil spring according to claim 10, wherein the dimension ratio of the length of the straight lines to the major axis is within the range from 0.5 to 0.8.

12. A coil spring according to claim 8, wherein the wire rod of the coil spring is a circular-section wire rod subjected to cold rolling or cold drawing so that the cross section has a major axis and a minor axis.

13. A coil spring according to claim 8, wherein the cross section of the wire rod of the coil spring has two straight lines extending in parallel in the direction to cross the direction of compression of the coil spring;
the wire rod of the coil spring has planar surfaces formed by the straight lines in the cross section extending along the length of the wire rod;
a starting end of the coil spring formed by the wire rod having the planar surfaces is wound to form a bearing surface for the coil such that at least from 50 percent to 100 percent of the length of one turn at the starting end is in an assumed surface; and
a terminal of the coil spring is similarly wound to form a bearing surface for the coil such that at least from 50 percent to 100 percent of the length of one turn at the terminal is in another assumed surface.

14. A coil spring according to claim 13, wherein the starting end of the coil spring formed by the wire rod having the planar surfaces is wound to form a bearing surface for the coil such that at least from 80 to 100 percent of the length of one turn at the starting end is in an assumed surface; and the terminal of the coil spring is similarly wound to form a bearing surface for the coil such that at least from 80 percent to 100 percent of the length of one turn at the terminal is in another assumed surface.

* * * * *